UNITED STATES PATENT OFFICE.

WALTER ROSENHAIN AND ERNEST HARRY RODD, OF TEDDINGTON, ENGLAND, ASSIGNORS TO THEMSELVES, THE IMPERIAL TRUST FOR THE ENCOURAGEMENT OF SCIENTIFIC AND INDUSTRIAL RESEARCH, OF WESTMINSTER, LONDON, ENGLAND, AND RICHARD TETLEY GLAZEBROOK, OF TEDDINGTON, ENGLAND.

MANUFACTURE OF A NEW COMPOUND OF ZIRCONIUM AND ITS APPLICATION IN THE PRODUCTION OF PURE ZIRCONIA.

1,307,881. Specification of Letters Patent. Patented June 24, 1919.

No Drawing. Application filed October 13, 1917. Serial No. 196,471.

*To all whom it may concern:*

Be it known that we, WALTER ROSENHAIN and ERNEST HARRY RODD, both subjects of the King of Great Britain, both residing in Teddington, England, have jointly invented a certain new and useful Improvement in the Manufacture of a New Compound of Zirconium and Its Application in the Production of Pure Zirconia, of which the following is a specification.

This invention relates to the manufacture of a new basic sulfate of zirconium which is useful as a source of zirconia and more particularly as a step in the production of substantially pure zirconia from minerals containing that compound.

The basic sulfate may be made by adding to an acid solution containing zirconium sulfate and preferably cold, a suitable alkali, such as ammonia or caustic soda until the acidity of the solution has been so far reduced that the whole or the greater part of the zirconia is precipitated as the basic sulfate, leaving any iron, aluminium, manganese and like impurities in solution.

The acid solution of the zirconium sulfate may be made from a zirconia mineral by any of the known methods; it is preferably acid with hydrochloric acid before it is treated as described above, since the presence of this acid favors the freedom of the basic sulfate from iron.

The precipitated basic sulfate may be washed and dried, or after washing it may be converted directly into zirconium hydroxid by adding an alkali such as ammonia solution to it before it is dried. The hydroxid may be washed, dried and ignited to obtain substantially pure zirconia.

The following example illustrates the invention:—

1 kilo of finely powdered crude zirconia and 1 kilo of water-ground fluorspar are mixed together and added, while stirring, to 2.2 liters of sulfuric acid of specific gravity 1.84 contained in a leaden or lead-lined vessel. When the preliminary frothing has ceased, the sludge is heated slowly during 12 to 16 hours until the sulfuric acid begins to fume and no hydrofluoric acid can be detected in the vapor. After cooling, the mass is agitated for some time with hot or boiling water to extract the soluble sulfates, and the whole is then diluted to 30–40 liters in a settling pan. The calcium sulfate having subsided, the liquor is decanted into a precipitating vessel.

100 cc. of hydrochloric acid of specific gravity 1.15 is added, and ammonia of specific gravity 0.880 is run in slowly, while stirring, until a fine-grained permanent white precipitate just begins to form. The formation of the precipitate, after the requisite quantity of ammonia has been added, is not immediate, but continues for a few minutes. The basic sulfate is allowed to settle and is washed by decantation until the wash-liquors are free from iron and titanium.

The hydrated basic sulfate so prepared contains 60–66 per cent. of $ZrO_2$, 15 per cent. –10 per cent. of $SO_3$, 0.1–0.2 per cent. of $Fe_2O_3$ and a trace of $SiO_2$. It consists for the most part of the new basic sulfate of the chemical formula $5ZrO_2.2SO_3.14H_2O$ which forms the subject-matter of a separate application for U. S. Letters Patent.

Having thus described the nature of the said invention and the best means we know of carrying the same into practical effect, we claim:—

1. The manufacture of a basic zirconium sulfate by adding an alkali to an acid solution containing zirconium sulfate until the acidity of the solution has been so far reduced that a permanent white precipitate begins to form and then allowing precipitation to continue without the further addition of alkali.

2. The manufacture of a basic zirconium sulfate by adding to a solution of zirconium sulfate an excess of hydrochloric acid, then running slowly into the solution, while stirring, ammonia until a fine-grained permanent white precipitate begins to form and then allowing precipitation to continue without further addition of ammonia.

In testimony whereof we have signed our names to this specification in the presence of two subscribing witnesses.

WALTER ROSENHAIN.
ERNEST HARRY RODD.

Witnesses to the signature of Walter Rosenhain:
C. S. HOPKINS,
E. C. WALKER.

Witnesses to the signature of Ernest Harry Rodd:
ERNALD S. MOSELEY,
MANSUR CLAUD.